(12) United States Patent
Xue et al.

(10) Patent No.: US 11,845,068 B2
(45) Date of Patent: Dec. 19, 2023

(54) USE OF N-BUTYLLITHIUM FOR CATALYZING HYDROBORATION OF IMINE AND BORANE

(71) Applicant: SOOCHOW UNIVERSITY, Suzhou (CN)

(72) Inventors: Mingqiang Xue, Suzhou (CN); Dandan Yan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 517 days.

(21) Appl. No.: 17/225,063

(22) Filed: Apr. 7, 2021

(65) Prior Publication Data

US 2021/0220808 A1    Jul. 22, 2021

Related U.S. Application Data

(63) Continuation of application No. PCT/CN2018/109370, filed on Oct. 8, 2018.

(51) Int. Cl.
*B01J 31/12* (2006.01)
*C07F 5/04* (2006.01)

(52) U.S. Cl.
CPC ............... *B01J 31/12* (2013.01); *C07F 5/04* (2013.01)

(58) Field of Classification Search
CPC .... B01J 31/12; B01J 31/122; B01J 2231/323; C07F 5/022; C07F 5/04
See application file for complete search history.

(56) References Cited

FOREIGN PATENT DOCUMENTS

| CN | 108164555 A | 6/2018 |
|----|-------------|--------|
| CN | 109331872 A | 2/2019 |
| EP | 1975170 A1  | 10/2008 |
| EP | 1988095 A2  | 11/2008 |

*Primary Examiner* — Brian A McCaig
(74) *Attorney, Agent, or Firm* — SZDC LAW P.C.

(57) ABSTRACT

The present invention relates to the use of n-butyllithium for catalyzing the hydroboration of an imine and a borane. A catalyst, the borane and the imine are sequentially stirred and mixed uniformly, and are reacted for 1-2 h; the mixture is exposed to air to terminate the reaction; and the reaction liquid is subjected to reduced pressure to remove the solvent, so as to obtain a borate with different substituents. The n-butyllithium disclosed in the present invention can be used for catalyzing the hydroboration of the imine and the borane in high activity under room temperature conditions, the amount of the catalyst is only 4-5 mol % of the molar weight of the imine, and the yield of the reaction can reach 90% or more.

6 Claims, No Drawings

USE OF N-BUTYLLITHIUM FOR CATALYZING HYDROBORATION OF IMINE AND BORANE

The present application is a Continuation Application of PCT/CN2018/109370, filed on Oct. 8, 2018, which is incorporated by reference for all purposes as if fully set forth herein.

TECHNICAL FIELD

The invention relates to the application of the commercial n-butyllithium reagent, in particular to the high-efficiency application of n-butyllithium in the catalytic hydroboration reaction of imine and borane.

BACKGROUND ART

Amine compounds and their derivatives are ubiquitous in nature, especially in the biological world, and have extremely important physiological functions. They are important organic compounds in the fields of biology, chemistry, medicine, etc. Many drugs contain amine functional groups, i.e. amino groups, such as proteins, nucleic acids, antibiotics and alkaloids. Amine compounds have many uses and have a wide range of applications. They are often used to synthesize textiles, dyes, polymers, pigments, and pesticides. Since the hydroboration of the carbonyl group is easy to occur, the development of a highly efficient catalytic system for the hydroboration of unsaturated C=N bonds is of great significance to modern industry and organic synthetic chemistry.

The borohydride reaction of imines has become a research hotspot in recent years. The reported catalysts used in the borohydride reaction of imines mainly include the catalytic systems of main group elements: magnesium, calcium, sodium, rhenium, zinc, etc. (See, Manna, K.; Ji, P.; Greene, F. X.; Lin, W. *J. Am. Chem. Soc.* 2016, 138, 7488-7491; Lin, Y-C.; Hatzakis, E.; McCarthy, S. M.; Reichl, K. D.; Lai, T-Y.; Yennawar, H. P.; Radosevich, A. T. *J. Am. Chem. Soc.* 2017, 139, 6008-6016). However, in the currently reported catalytic systems, the catalysts are relatively expensive or difficult to prepare, or the reaction time is long. The reaction needs to be carried out at high temperature, and some catalyst systems have low yields. Therefore, it is important to develop a catalytic system that efficiently catalyzes the hydroboration of imine under mild conditions.

Technical Problem

The object of the invention of the present invention is to provide the application of n-butyllithium, i.e., the application of n-butyllithium in the catalytic hydroboration reaction of imine and borane.

Technical Solution

In order to achieve the above object of the invention, the technical scheme adopted by the present invention is: the application of n-butyllithium in the catalytic hydroboration reaction of imine and borane; the n-butyllithium is the commercial n-butyllithium reagent.

The invention also discloses an n-butyllithium catalyzed hydroboration reaction of imine and borane, which includes the following steps:

In an anhydrous and oxygen-free environment, under an inert gas atmosphere, loading the imine to the reaction flak, which is treated by dehydration and deoxidation, adding an organic solvent, adding borane, mixing evenly, adding the catalyst n-butyllithium, reacting for 1 h to 2 h, and stirring in air to stop reaction and to obtain the product.

The invention further discloses a method for preparing a boric acid ester by a hydroboration reaction of imine and borane, which includes the following steps:

In an anhydrous and oxygen-free environment, under an inert gas atmosphere, loading the imine to the reaction flask, which is treated by dehydration and deoxidation, adding an organic solvent, adding borane, mixing evenly, adding the catalyst n-butyllithium, reacting for 1 h-2 h and stirring in air to stop reaction and to obtain the product.

In the technical solution above, the imine is an aldimine; the general chemical structural formula of the imine is as follows:

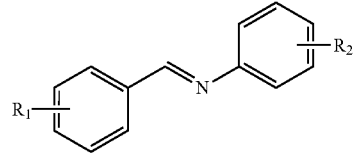

Wherein $R_1$ or $R_2$ is an electron-withdrawing group or an electron-donating group, which can be selected from the group consisting of halogen, methyl, and methoxy; the borane is pinacol borane.

In the technical solution above, the amount of the catalyst can be 4% to 5% of a molar amount of the imine, and the molar ratio of imine to pinacol borane is 1:1 to 1:1.2.

In the technical solution above, the reaction temperature is room temperature, and the reaction time is between 1 to 2 hours.

In the technical solution above, the organic solvent is tetrahydrofuran.

The above technical solution can be expressed as follows:

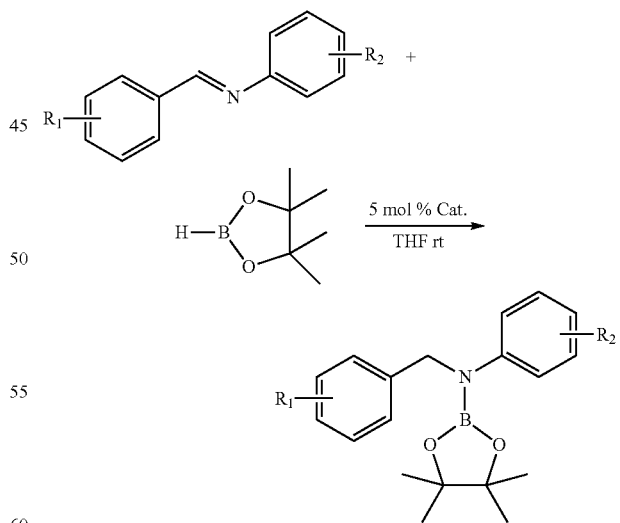

Beneficial Effect

Due to the application of the above technical solutions, the present invention has the following advantages compared with the prior art:

1. The invention finds for the first time that the commercial n-butyllithium reagent can efficiently catalyze the borohydride reaction between imine and borane, which is highly compatible with the economical synthesis of atoms.
2. The n-butyllithium catalyst disclosed in the present invention has a high catalytic activity for the hydroboration reaction of imine and borane (4% to 5% of the moles of catalyst used), the reaction time is short (1 h to 2 h), and the reaction conditions are mild (room temperature), high reaction yield, simple and controllable reaction, simple post-treatment, THF as solvent.
3. The catalyst disclosed by the invention has good universality for imines with different substitution positions and different electronic effects.

EMBODIMENTS OF THE INVENTION

The present invention will be further described in combination with the following embodiments:

Example 1 Catalytic Hydroboration Reaction of Biphenylaniline and Pinacol Borane by n-Butyllithium In a reaction flask, which was treated by dehydration and deoxidation, 0.5 mmol of biphenylaniline and 100 μl of THE were added under the protection of argon. 0.5 mmol (0.0726 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 90%. $^1$H NMR data of the product is: $^1$H NMR (CDCl$_3$, 400 MHz) δ: 7.29-7.12 (m, 9H), 6.88-6.84 (t, 1H), 4.69 (s, 2H), 1.29 (s, 12H).

Example 2 Catalytic Hydroboration Reaction of Biphenylaniline and Pinacol Borane by n-Butyllithium In a reaction flask, which was treated by dehydration and deoxidation, 0.5 mmol of biphenylaniline and 100 μl of THE were added under the protection of argon. 0.55 mmol (0.0798 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 95%. $^1$H NMR data of the product is: $^1$H NMR (CDCl$_3$, 400 MHz) δ: 7.29-7.12 (m, 9H), 6.88-6.84 (t, 1H), 4.69 (s, 2H), 1.29 (s, 12H).

Example 3 Catalytic Hydroboration Reaction of Biphenylaniline and Pinacol Borane by n-Butyllithium In a reaction flask, which was treated by dehydration and deoxidation, 0.5 mmol of biphenylaniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to the NMR tube. The conversion rate calculated based on $^1$H is 96%. $^1$H NMR data of the product is: $^1$H NMR (CDCl$_3$, 400 MHz) δ: 7.29-7.12 (m, 9H), 6.88-6.84 (t, 1H), 4.69 (s, 2H), 1.29 (s, 12H).

Example 4 Catalytic Hydroboration Reaction of Biphenylaniline and Pinacol Borane by n-Butyllithium In a reaction flask, which was treated by dehydration and deoxidation, 0.5 mmol of biphenylaniline and 100 μl of THE were added under the protection of argon. 0.60 mmol (0.0871 mL) of borane was added with a pipette gun and mixed well. Finally, 20 μl of n-butyllithium tetrahydrofuran solution (1M) (4 mol % amount) was added. The reaction was carried out for 2 hours. A drop of the reaction solution was taken and added to an NMR tube. CDCl$_3$ was then added to the NMR tube. The conversion rate calculated based on $^1$H is 97%. $^1$H NMR data of the product is: $^1$H NMR (CDCl$_3$, 400 MHz) δ: 7.29-7.12 (m, 9H), 6.88-6.84 (t, 1H), 4.69 (s, 2H), 1.29 (s, 12H).

Example 5 Catalytic Hydroboration Reaction of Biphenylaniline and Pinacol Borane by n-Butyllithium In a reaction flask, which was treated by dehydration and deoxidation, 0.5 mmol of biphenylaniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.29-7.12 (m, 9H), 6.88-6.84 (t, 1H), 4.69 (s, 2H), 1.29 (s, 12H).

If 4-methoxyaniline lithium was replaced with the lithium compound of formula I, a hydroboration product could not be obtained.

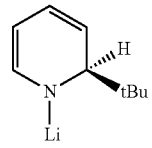

Formula I

Example 6 Catalytic Hydroboration Reaction of N-(p-Methylbenzylidene) Aniline and Pinacol Borane by n-Butyllithium In a reaction flask, which was treated by dehydration and deoxidation, 0.5 mmol of N-(p-methylbenzylidene) aniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.23-7.08 (m, 8H), 6.89-6.85 (t, 1H), 4.66 (s, 2H), 2.31 (s, 3H), 1.30 (s, 12H).

Example 7 Catalytic Hydroboration Reaction of N-(p-Methylbenzylidene) Aniline and Pinacol Borane by n-Butyllithium In a reaction flask, which was treated by dehydration and deoxidation, 0.5 mmol of N-(p-methylbenzylidene) aniline and 100 μl of THE were added under the protection of argon. 0.60 mmol (0.0871 mL) of borane was added with a pipette gun and mixed well. Finally, 20 μl of n-butyllithium tetrahydrofuran solution (1M) (4 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.22-7.13 (d, 6H), 6.89-6.80 (d, 3H), 4.63 (s, 2H), 3.77 (s, 3H), 1.30 (s, 12H).

Example 8 Catalytic Hydroboration Reaction of N-(4-Fluorobenzylidene) Aniline and Pinacol Borane by n-Butyllithium In a reaction flask, which was treated by dehydration and deoxidation, 0.5 mmol of N-(4-fluorobenzylidene) aniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.22-7.15 (d, 6H), 6.98-6.94 (d, 3H), 4.66 (s, 2H), 1.30 (s, 12H).

Example 9 Catalytic Hydroboration Reaction of N-(4-Chlorobenzylidene) Aniline and Pinacol Borane by n-Butyllithium In a reaction flask, which was treated by dehydration and deoxidation, 0.5 mmol of N N-(4-chlorobenzylidene) aniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.20-7.14 (d, 6H), 6.99-6.93 (d, 3H), 4.64 (s, 2H), 1.30 (s, 12H).

Example 10 Catalytic Hydroboration Reaction of N-(4-Bromobenzylidene) Aniline and Pinacol Borane by n-Butyllithium In a reaction flask, which was treated by dehydration and deoxidation, 0.5 mmol of N-(4-bromobenzylidene) aniline and 100 μl of THF were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.24-7.16 (d, 6H), 6.97-6.93 (d, 3H), 4.63 (s, 2H), 1.31 (s, 12H).

Example 11 Catalytic Hydroboration Reaction of Benzylidene-p-Toluidine and Pinacol Borane by n-Butyllithium In a reaction flask, which was treated by dehydration and deoxidation, 0.5 mmol of benzylidene-p-toluidine and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.32-7.28 (d, 5H), 7.10-7.08 (d, 2H), 6.64-6.60 (d, 2H), 4.62 (s, 2H), 1.31 (s, 12H).

Example 12 Catalytic Hydroboration Reaction of N-(Benzylidene)-4-Fluoroaniline and Pinacol Borane by n-Butyllithium In a reaction flask, which was treated by dehydration and deoxidation, 0.5 mmol of N-(benzylidene)-4-fluoroaniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.24-7.02 (d, 7H), 6.75-6.70 (d, 2H), 4.66 (s, 2H), 1.32 (s, 12H).

Example 13 Catalytic Hydroboration Reaction of N-(Benzylidene)-4-Choroaniline and Pinacol Borane by n-Butyllithium In a reaction flask, which was treated by dehydration and deoxidation, 0.5 mmol of N-(benzylidene)-4-chloroaniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.26-7.05 (d, 7H), 6.74-6.69 (d, 2H), 4.61 (s, 2H), 1.30 (s, 12H).

Example 14 Catalytic Hydroboration Reaction of N-(Benzylidene)-4-Bromoaniline and Pinacol Borane by n-Butyllithium In a reaction flask, which was treated by dehydration and deoxidation, 0.5 mmol of N N-(benzylidene)-4-bromoaniline and 100 μl of THE were added under the protection of argon. 0.60 mmol (0.0871 mL) of borane was added with a pipette gun and mixed well. Finally, 25 μl of n-butyllithium tetrahydrofuran solution (1M) (5 mol % amount) was added. The reaction was carried out for 2 hours. A drop of the reaction solution was taken and added to an NMR tube.

CDCl₃ was then added to the NMR tube. The conversion rate calculated based on ¹H is 99%. ¹H NMR data of the product is: ¹H NMR (CDCl₃, 400 MHz) δ: 7.27-7.03 (d, 7H), 6.76-6.71 (d, 2H), 4.62 (s, 2H), 1.30 (s, 12H).

The examples above were conducted at room temperature. The present invention discloses that the commercial reagent n-butyllithium can catalyze the borohydride reaction of imine under mild reaction conditions, with a high yield and a wide substrate. The scope of application, low price of the catalyst and mild catalytic conditions provide possibilities for industrial applications.

The invention claimed is:

1. A method of preparing a borate ester comprising:
reacting an imine with a borane in an organic solvent and in the presence of n-butyllithium as a catalyst at room temperature under anhydrous, oxygen-free, and inert gas conditions for 1-2 hours; and
stirring in air to stop reaction and to obtain the borate ester.

2. The method of claim 1, wherein:
the imine has the following structure:

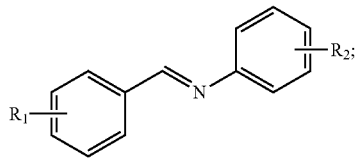

the borane is pinacol borane;
the borate ester has the following structure:

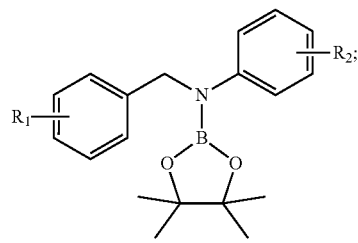

and

R₁ and R₂ are independently selected from the group consisting of halogen, methyl and methoxy.

3. The method of claim 1, wherein the organic solvent is tetrahydrofuran.

4. The method of claim 1, wherein an amount of n-butyllithium is 4% to 5% of a molar amount of the imine.

5. The method of claim 1, wherein a molar ratio of the imine to the borane is 1:1 to 1:1.2.

6. The method of claim 5, wherein the molar ratio of the imine to the borane is 1:1.2.

* * * * *